United States Patent [19]

Takahira et al.

[11] Patent Number: 5,382,778
[45] Date of Patent: Jan. 17, 1995

[54] NON-CONTACT IC CARD

[75] Inventors: Kenichi Takahira; Toshiyuki Matsubara, both of Itami, Japan

[73] Assignee: Mitsubishi Denki Kabushiki Kaisha, Tokyo, Japan

[21] Appl. No.: 966,005

[22] Filed: Oct. 23, 1992

[30] Foreign Application Priority Data

Nov. 26, 1991 [JP] Japan .................. 3-310801

[51] Int. Cl.⁶ ............................................. G06K 5/00
[52] U.S. Cl. ................................. 235/380; 235/492; 235/382; 235/381; 235/379; 340/825.34; 340/825.31
[58] Field of Search ................ 235/380, 379, 381, 382, 235/382.5, 492, 440, 436, 384, 437; 902/26, 10, 25, 24; 340/825.34, 825.31

[56] References Cited

U.S. PATENT DOCUMENTS

| 4,529,870 | 7/1983 | Chaum | 235/380 |
| 4,877,947 | 10/1989 | Mori | 235/379 |
| 5,191,192 | 3/1993 | Takahira et al. | 235/375 |
| 5,204,663 | 4/1993 | Lee | 340/825.34 |
| 5,221,838 | 6/1993 | Gutman et al. | 235/472 |
| 5,252,965 | 10/1993 | Gidwani et al. | 340/825.34 X |
| 5,266,785 | 11/1993 | Sugihara et al. | 235/382 X |

FOREIGN PATENT DOCUMENTS

| 0086286 | 11/1982 | European Pat. Off. . | |
| 0206595 | 8/1990 | Japan | 235/384 |
| 3038795 | 2/1991 | Japan | 235/379 |
| 8303018 | 2/1983 | WIPO . | |
| WO8707061 | 11/1987 | WIPO . | |

Primary Examiner—Donald Hajec
Assistant Examiner—Esther Chin
Attorney, Agent, or Firm—Leydig, Voit & Mayer

[57] ABSTRACT

A non-contact IC card include a data transmitting-/receiving device, a memory, a CPU, a first determining device, a second determining device, and a stopping device. When the data transmitting/receiving device receives a request signal, the first determining device determines whether first system identification information stored in the memory agrees with second system identification information contained in the request signal. At the same time, the second determining device determines whether use of the IC card indicated by use authorization information stored in the memory is authorized. When the first and second system identification information do not agree or when the use authorization information indicates that use of the IC card is not authorized, the stopping device stops the operation of the CPU until the next request signal is received.

6 Claims, 8 Drawing Sheets

FIG. 6

| 31 — SYSTEM ID CODE | | USE AUTHORIZATION BIT — 32 | |
|---|---|---|---|
| 33 — VALID PERIOD INFORMATION | | | |
| D(1) | START ADDRESS FOR READING | | READ LENGTH |
| D(2) | • | | • |
| D(3) | • | | • |
| 34 — CARD ID INFORMATION | | | |
| F(1) | F(2) | PREPAYMENT BALANCE INFORMATION | — 39 |
| 35 — NUMBER OF PASSES | | PASS RECORD CONTROL INFORMATION | — 38 |
| 36 — PASS CODE 1 | PASSAGE TIME INFORMATION 1 — 37 | | |
| • | • | | |
| • | • | | |

NON-CONTACT IC CARD

BACKGROUND OF THE INVENTION

1. Field of the Invention

The present invention relates to a non-contact IC card and, more particularly, to a non-contact IC card which prevents radio interference and effectively performs a communication process.

2. Description of the Related Art

Of various types of IC cards, a non-contact type IC card has been utilized in recent years which employs electromagnetic waves, light or the like to exchange signals. FIG. 10 shows tile structure of such a non-contact IC card. A ROM 2 and a RAM 3 are connected through a bus 8 to a CPU 1 controlling the operation of an IC card 1A. An input/output control circuit 4 (hereinafter referred to as an I/O control circuit 4) is connected to the bus 8, which I/O control circuit 4 is used for controlling the output of data to an external unit 9 of an application system and the input of data from it. An antenna 6 is connected to the I/O control circuit 4 via a modulating/demodulating circuit 5. The IC card has a built-in battery 7 which supplies electricity to electric circuits.

In such an IC card 1A, when the antenna 6 receives a request signal in the form of an electromagnetic wave from the external unit 9, the request signal is input through the I/O control circuit 4 to the CPU 1 after having been demodulated by the modulating/demodulating circuit 5. Upon receiving the request signal, the CPU 1 reads the identification information of the IC card 1 which has already been recorded in the RAM 3 and then unconditionally outputs this information in the form of a response signal. The response signal is input via the I/C control circuit 4 to the modulating/demodulating circuit 5, which modulates it before it is transmitted through the antenna 6 to the external unit 9.

There is a type of IC card in which, when it is used, additional data, such as a period, a section and an amount of money, is recorded in a RAM, and, the additional data, together with the response signal, is unconditionally transmitted to an external unit.

The IC card 1A unconditionally transmits the response signal in response to the request signal from the external unit 9. Therefore, when the IC card 1A is placed within an area accessible to the external unit of another non-contact IC card system which has an electrical function similar to that of the external unit 9, the IC card 1A may transmit the response signal to the external unit of the other application system. When a card user simultaneously has two types of non-contact IC cards respectively corresponding to the two different non-contact IC card systems and he passes an area accessible to the external unit of one system, the two IC cards may each receive the request signal from the external unit, thus transmitting a response signal. This causes radio interference and data processing to be performed erroneously.

With the above type of IC card in which the additional data, together with the response signal is transmitted unconditionally, a great amount of time is required to complete a communication in response to the external unit, thus increasing electric power consumed when the card holder passes an area accessible to the external unit, and therefore decreasing the life of the built-in battery.

SUMMARY OF THE INVENTION

The present invention has been made to solve the above problems. Accordingly, the object of this invention is to provide a non-contact IC card capable of effectively and accurately performing a communication process.

In order to achieve the above object, according to a first aspect of the present invention, there is provided a non-contact IC card comprising: data transmitting/receiving means for exchanging data with an external unit without direct contact; a memory for storing first system identification information identifying an application system and use authorization information indicating whether the IC card can be used; data processing means for processing, on the basis of a request signal received by the data transmitting/receiving means, the data so as to transmit a response signal through the data transmitting/receiving means; first determining means for determining, when the data transmitting/receiving means receives the request signal, whether the first system identification information stored in the memory agrees with second system identification information which is contained in the request signal and used for identifying the application system; second determining means for determining, when the data transmitting/receiving means receives the request signal, whether the use authorization information stored in the memory indicates that the IC card can be used; and stopping means for stopping, when the first determining means determines that the first system identification information does not agree with the second system identification information or when the second determining means determines that the IC card indicated by the use authorization information cannot be used, operation of the data processing means until the data transmitting/receiving means receives a next request signal.

According to a second aspect of this invention, there is provided a non-contact IC card comprising: data transmitting/receiving means for exchanging data with an external unit without direct contact; a memory for storing the data and control information; collating means for collating, when the data transmitting/receiving means receives the request signal, collation information contained in a request signal with the control information stored in the memory; and data processing means for reading from the memory the data based on a collation result obtained by the collating means to create a response signal to which the data is added so that the response signal is transmitted through the data transmitting/receiving means.

With the non-contact IC card according to the first aspect of this invention, when the data transmitting/receiving means receives the request signal, the first determining means determines whether the first system identification information stored in the memory agrees with the second system identification information contained in the request signal. At the same time, the second determining means determines whether the IC card indicated by the use authorization information stored in the memory can be used. When the first and second system identification information does not agree or when the use authorization information indicates that the IC card cannot be used, the stopping means stops the operation of the data processing means until the next request signal is received.

With the non-contact IC card according to the second aspect of this invention, when the data transmitting- /receiving means receives the request signal, the collating means collates the collation information contained in the request signal with the control means stored in the memory. The data processing means reads from the memory data based on the results of the collation so as to create the response signal to which the data is added. The response signal is then transmitted through the data transmitting/receiving means.

BRIEF DESCRIPTION OF THE DRAWINGS

FIG. 6 is a view showing the structure of application information used in a second embodiment;

DESCRIPTION OF THE PREFERRED EMBODIMENTS

Figure 1:
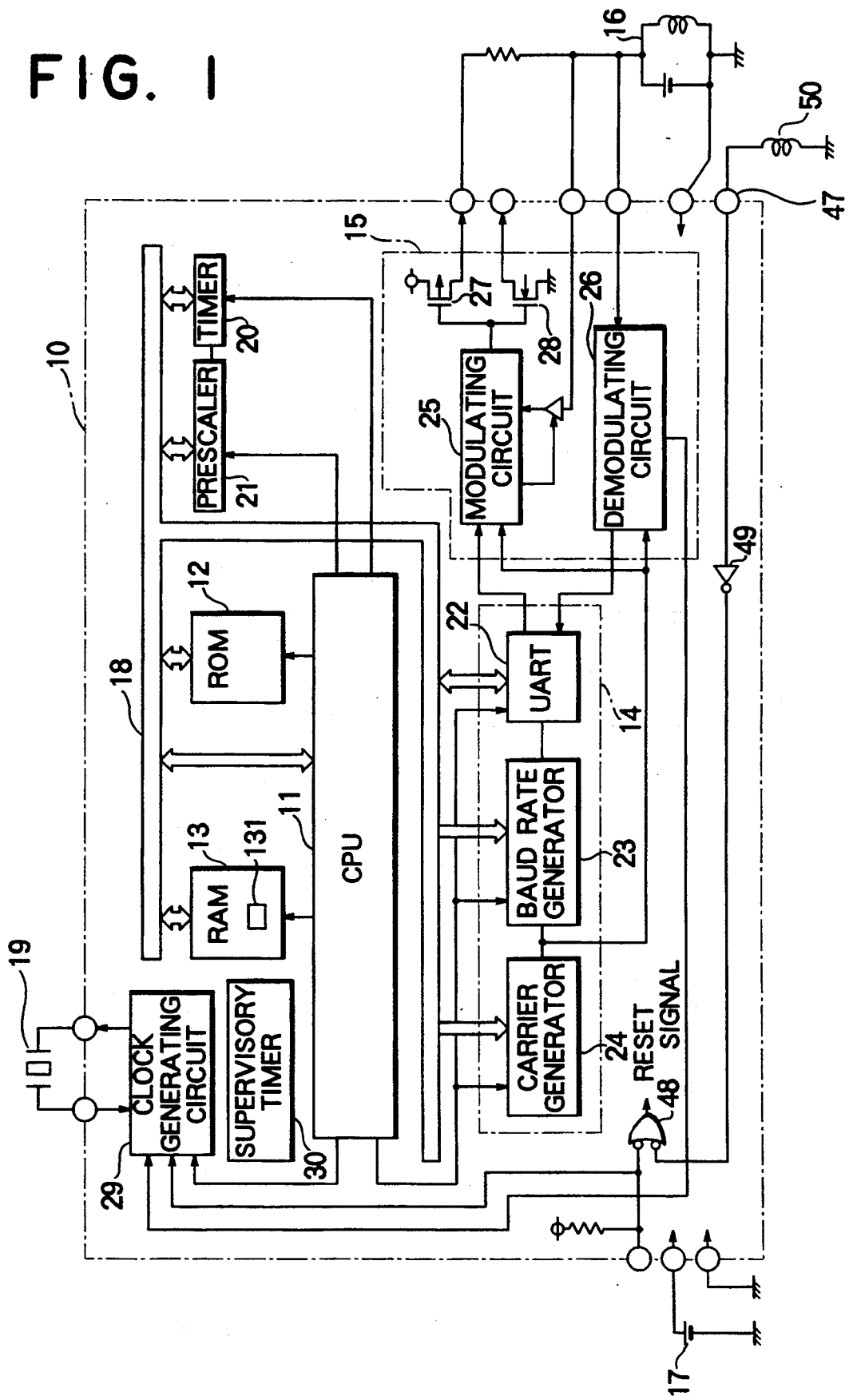
FIG. 1 is a block diagram showing a non-contact IC card in accordance with a first embodiment of the present invention.

In FIG. 1, an IC card of a first embodiment has an IC 10. An antenna circuit 16, a battery 17 and a crystal resonator 19 are connected to the IC 10, which has a CPU 11 linked to a bus 18. A ROM 12, a RAM 13, and an I/O control circuit 14 are connected to the bus 18. The ROM 12 is used for storing a program controlling the operation of the CPU 11; the RAM 13 is used for storing data; and the I/O control circuit 14 is used for controlling the input/output of data transmitted to and from an external unit (not shown). A timer 20 for dividing and counting an internal clock, and a prescaler 21 for setting the initial value of the timer 20 are connected to the bus 18.

The I/O control circuit 14 is equipped with a UART 22 for transmitting serial asynchronous data, a baud rate generator 23 for setting the speed at which the UART 22 transmits data, and a carrier generator 24 for generating a carrier signal. A modulating/demodulating circuit 15, to which the antenna circuit 16 is coupled, is connected to the I/O control circuit 14. The modulating/demodulating circuit 15 is provided with a modulating circuit 25 for modulating the output of the UART 22 based on the carrier, a demodulating circuit 26 for demodulating an input signal from the antenna circuit 16, and output transistors 27 and 28 for operating the antenna circuit 16.

A clock generating circuit 29 for feeding a clock signal to the circuits in the IC 10 is connected to the CPU 11 and the demodulating circuit 26 of the modulating/demodulating circuit 15. The clock generating circuit 29 is connected to the crystal resonator 19 outside the IC 10. Numeral 30 denotes a supervisory timer for monitoring excessive operation of the CPU 11. A coil 50 is connected to a reset terminal 47 of the IC 10. A reset reception circuit 49 composed of a CMOS inverter gate detects a signal generated in the coil 50 by electromagnetic induction from a magnetic field produced by the external unit. This signal is input as an internal reset signal through an OR gate 48.

A zone 131 for storing application information of the IC card is formed in the RAM 13.

Figure 2:
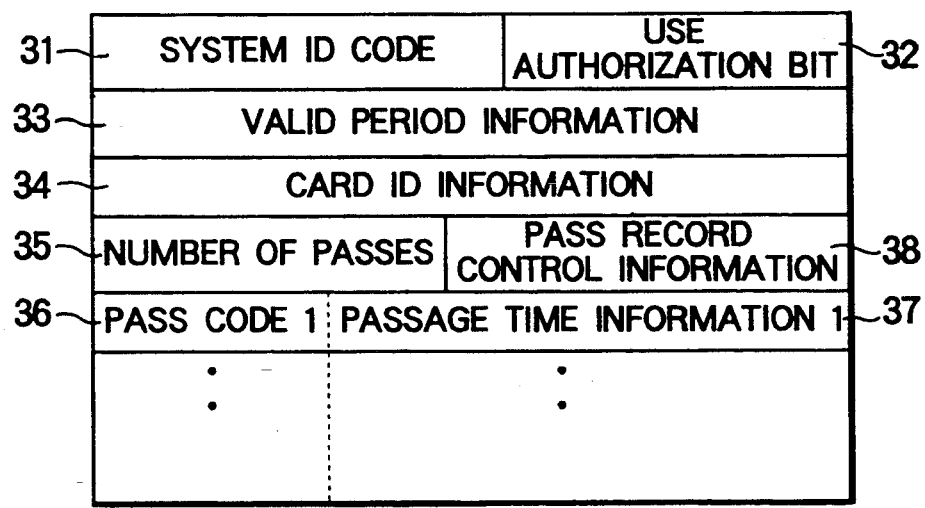
FIG. 2 is a view showing the structure of application information stored in a zone 131 of a RAM 13 illustrated in FIG. 1.

FIG. 2 shows the structure of the application information stored in the zone 131 of the RAM 13. A system ID code 31 is system ID information used for identifying a non-contact IC card system with which the IC card of this invention can be used. A use authorization bit 32 represents information indicating whether the IC card can be used with the particular system to which the IC card belongs. The use authorization bit 32 is set at "1" when the IC card can be used, and at "0" when it cannot be used. Valid period information 33 is used for determining the period for which the IC card can be used. Card ID information 34 is used for identifying the IC card. Each IC card has its specific code. The above-mentioned system IC code 31, use authorization bit 32, valid period information 33 and card ID information 34 are all set by a card issuer when the IC card is issued.

The number of passes 35 indicates the number of communication processes performed normally between the IC card and the external unit of the application system. Such number is increased by one every time the communication process is performed. A pass code 36 and passage time information 37 sequentially record a pass code and a passage time code every time the communication process is performed normally between the IC card and the external unit. The pass and passage time codes are used for identifying information regarding where a pass is made, this information being received from the external unit. Pass record control information 38 stores a pointer used for sequentially recording the pass and passage time codes.

Figure 4:
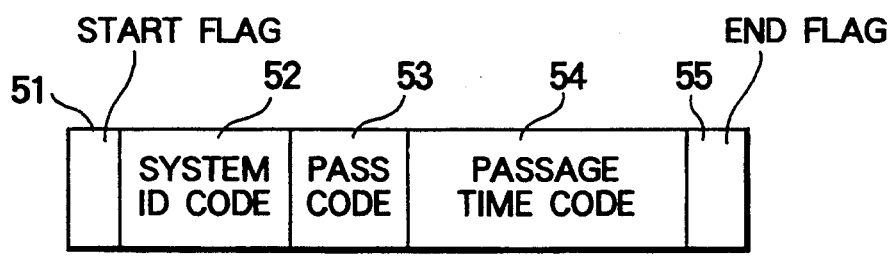
FIG. 4 is a view showing the structure of data contained in a request signal used in the first embodiment.

FIG. 4 shows an example of the format of data contained in a request, signal transmitted from the external unit. The request signal has a start flag 51, a system ID code 52 serving as system ID information, a pass code 53, a passage time code 54 and an end flag 55.

The operation of the first embodiment will now be described with reference to the flowchart of FIG. 3. The CPU 11 stands ready outputting a stop command to the clock generating circuit 29 until it receives a trigger signal from the external unit, thereby preventing the generation of the internal clock. When the IC card enters an area accessible to the external unit of a control device or the like of an automatic wicket machine, for example, in a railroad station, the trigger signal is transmitted from the external unit, received by the antenna circuit 16, and then recognized by the demodulating circuit 26 of the modulating/demodulating circuit 15. The demodulating circuit 26 outputs a command to the clock generating circuit 29 so as to start the circuit 29, which supplies the internal clock to various circuits inside the IC 10.

Figure 3:
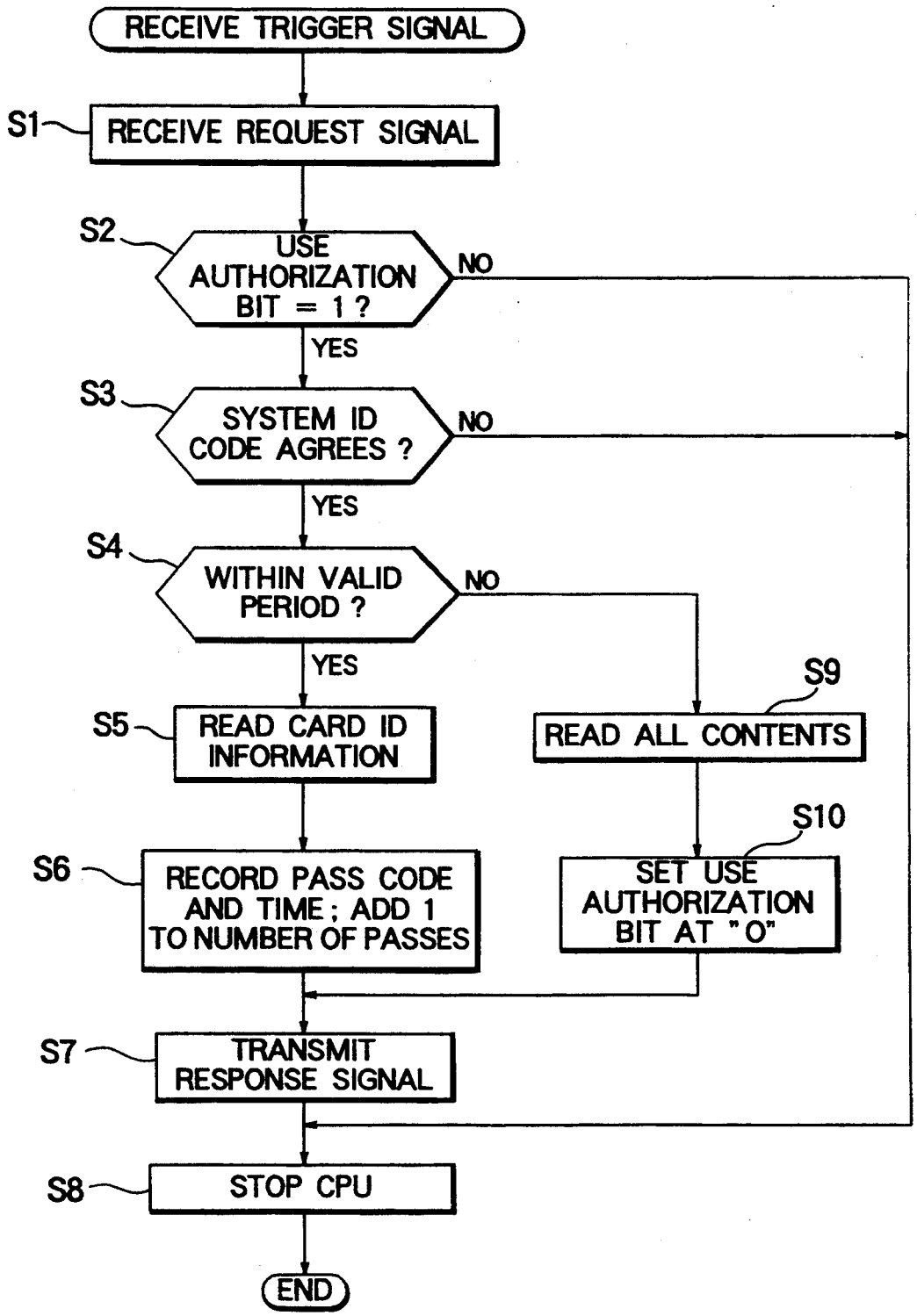
FIG. 3 is a flowchart showing the operation of the first embodiment.

When the internal clock is thus generated, the CPU 11 reads a program from the ROM 12 to process data in accordance with the flowchart shown in FIG. 3. After the reception of the trigger signal, the request signal is received from the external unit in step S1. FIG. 4 shows an example of the format of data contained in the request signal transmitted from the external unit. The request signal has the start flag 51, the system ID code 52, which serves as system identifying information, the pass code 53, the passage time code 54 and the end flag 55. The IC card temporarily stores the received request signal in a reception buffer of the RAM 13.

In step S2, the CPU 11 reads the use authorization bit 32 contained in the application information stored in the zone 131 of the RAM 13, and confirms the value of this bit 32 as being either "1" or "0". If it is "1", the IC card can be used. In step S3 the system ID code 31 contained in the application information is read and collated with the system ID code 52 contained in the request signal. If both codes agree, in step S4 the valid period information 33 contained in the application information is read, and a determination is made whether a passage time indicated by the passage time code 54 contained in the request signal is within the valid period. If the passage time is within the valid period, in step S5 the card ID information 34 contained in the application information is read. In step S6, the pass code 53 and the passage time code 54 contained in the request signal are recorded in the application information in the form of the pass code 36 and the passage time information 37, respectively. At the same time, the number of passes contained in the application information is increased by one. The card ID information read in step S5 is used as a response signal to be transmitted via the antenna circuit 16 to the external unit in step S7. In step S8, the operation of the clock generating circuit 29 is stopped, thus stopping the CPU 11.

In step S2 if the use authorization bit 32 is determined to be set at "0", or in step S3 if it is determined that the system ID code 31 contained in the application information does not agree with the system ID code 52 contained in the request signal, then the response signal is not transmitted to the external unit, and the operation immediately proceeds to step S8, where the CPU 11 is stopped.

If in step S4 the passage time is outside of the valid period, the operation proceeds to step S9, where all contents of the application information are read. In step S10, the use authorization bit 32 of the application information is set at "0". In step S7, all contents read are transmitted in the form of the response signal to the external unit.

Figure 5:
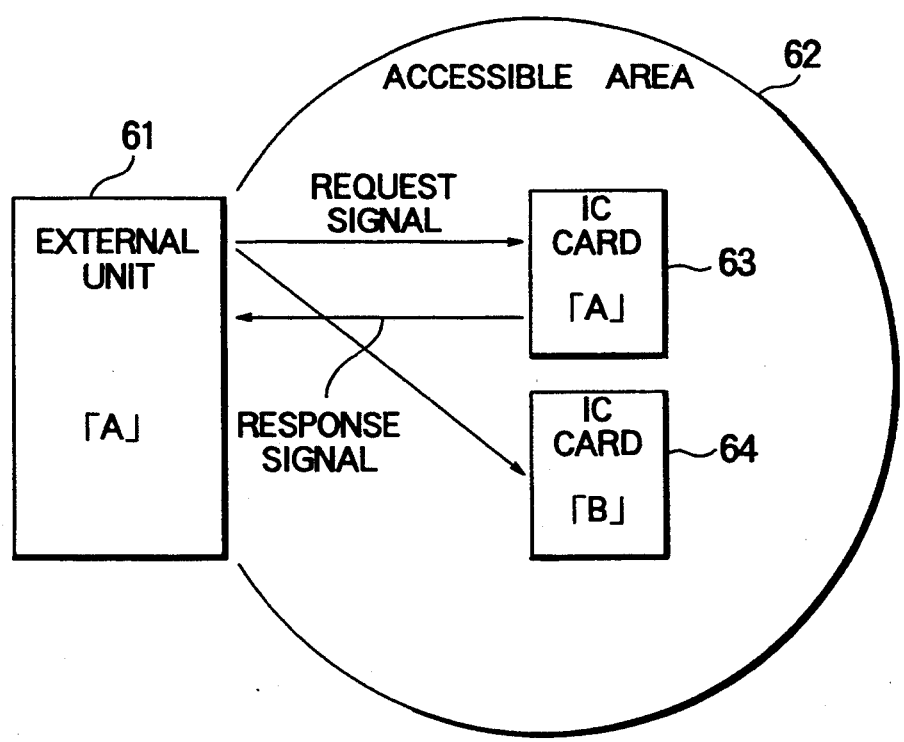
FIG. 5 is a view schematically showing the operation of the first embodiment.

As described above, in step S3 of this embodiment, the system ID code 31 contained in the IC card is collated with the system ID code 52 contained in the request signal transmitted from the external unit. For this reason, as shown in FIG. 5, for instance, when an IC card 63 having a system ID code "A" and another IC card 64 having a system ID code "B" are positioned within an area 62 accessible to an external unit 61 having a system ID code "A", the response signal is transmitted in response to the request signal from the IC card 63 having the same system ID code as that of the external unit 61. However, the response signal is not transmitted from the IC card 64 having a different system ID code. It is thus possible to prevent radio interference and the communication process from being performed erroneously.

FIG. 2 shows only one example of the application information, and application information having a structure other than that shown in FIG. 2 may also be used. For example, application information shown in FIG. 6 may be stored in the zone 131 of the RAM 13. This application information is suitable for a prepayment type IC card. Data denoted by 31 to 38 shown in FIG. 6 is the same data denoted by the identical numerals in FIG. 2. Prepayment balance information 39 is control information indicating the balance of the IC card. D(1) to D(3) denote data items for regulating information added to the response signal when this signal is transmitted to the external unit. The data items D(1) to D(3) each have a start address and a length both used for reading the RAM 13. F(1) denotes a flag indicating whether the IC card is within the valid period, and F(2) denotes another a flag indicating whether the balance is not less than the amount of money to be deducted.

Figure 7:
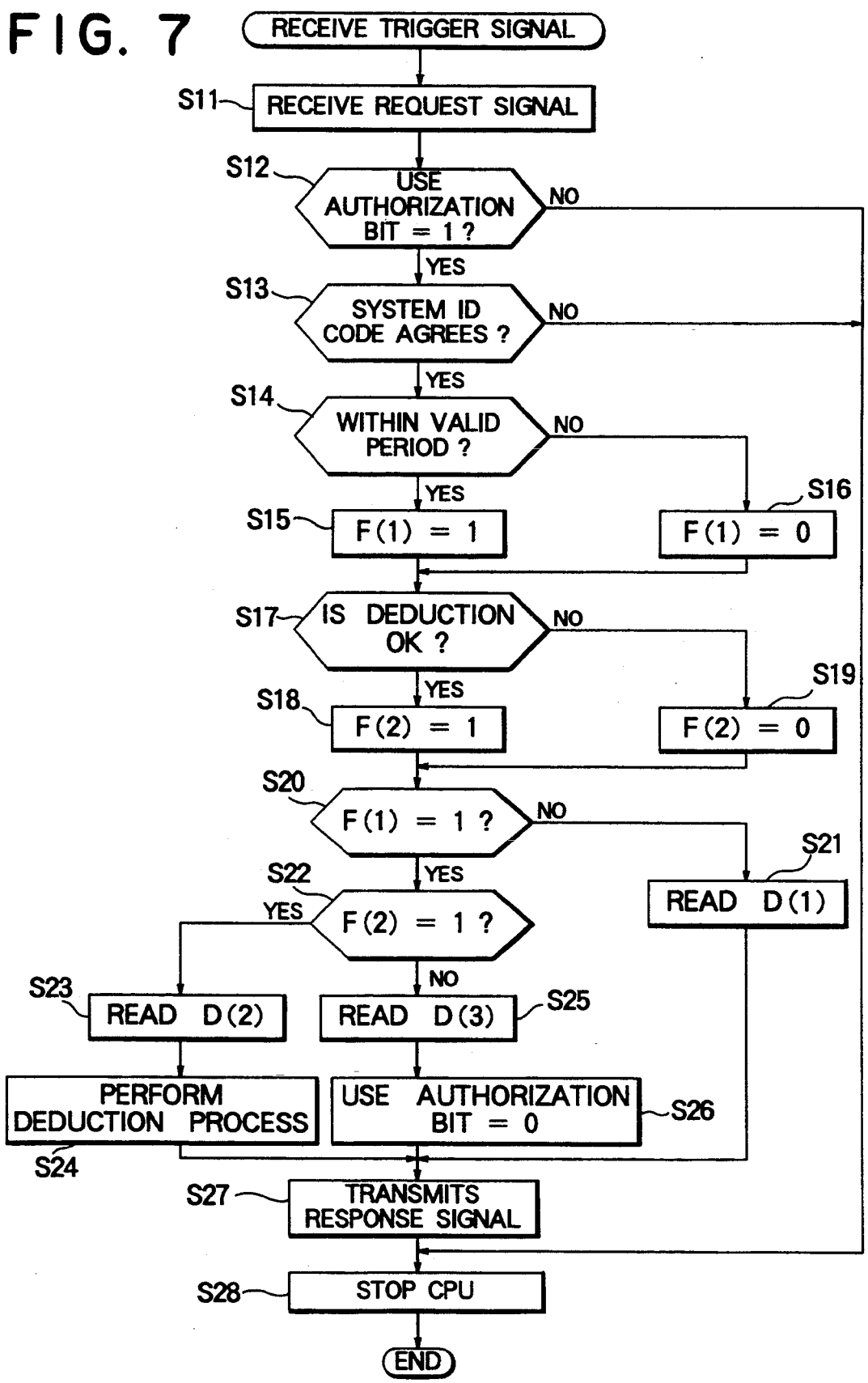
FIG. 7 is a flowchart showing the operation of the second embodiment.
Figure 8:
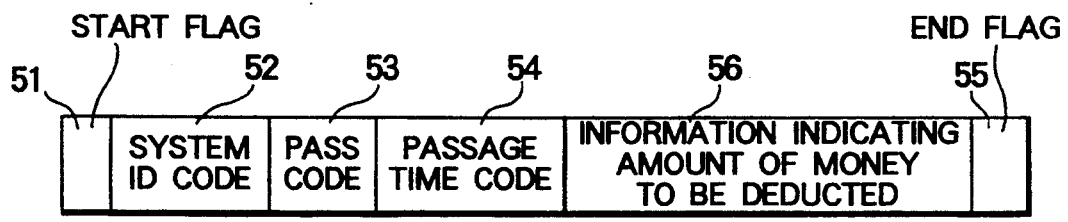
FIG. 8 is a view showing the structure of data contained in a request signal used in the second embodiment.

The operation of an IC card according to a second embodiment using such application information will now be described with reference to the flowchart shown in FIG. 7. When the IC card enters an area accessible to the external unit of, for example, a prepayment type ingress/egress gate terminal, a trigger signal and then a request signal are received from the external unit in step S11. As shown in FIG. 8, the request signal transmitted from the external unit contains withdrawal information 56 indicating the amount of money to be deducted from the prepaid amount of money indicated in the IC card, in addition to the start flag 51, the system ID code 52, the pass code 53, the passage time code 54 and the end flag 55. The withdrawal information 56 is collated with the prepayment balance information 39, which is control information, stored in the zone 131 of the RAM 13.

In step S12, the CPU 11 confirms whether the value of the use authorization bit 32 contained in the application information is "1" or "0". If it is "1", the IC card can be used. In step S13, the system ID code 31 contained in the application information is collated with the system ID code 52 contained in the request signal. If both codes agree, a determination is then made in step S14 whether a passage time indicated by the passage time code 54 contained in the request signal is within the valid period. This determination is based on the valid period information 33. If the passage time is within the valid period, the flag F(1) of the application information is set at "1" in step S15. If it is out of the valid period, the flag F(1) is set at "0" in step S16. In step S17, the prepayment balance information 39 contained in the application information is read, and the balance indicated by the prepayment balance information 39 is compared with the amount of money indicated by the withdrawal information 56 contained in the request signal to determine whether the above amount of money can be deducted from the balance, that is, whether the balance is sufficient. If the amount of money can be deducted, in step S18 the flag F(2) of the application information is set "1", whereas if it cannot be deducted, the flag F(2) is set at "0" in step S19.

In step S20, the value of the flag F(1) is confirmed. If it is "0", the passage time is out of the valid period. In step S21, the contents of the RAM 13 where the data item D(1) of the application information is set are read. If the value of the flag F(1) is "1", the value of the flag F(2) is confirmed in step S22. If it is determined to be "1", the amount of money can be deducted. In step S23 the contents of the RAM 13 where the data D(2) is set are read. In step S24 a deduction process is performed. In the deduction process, the amount of money indicated by the withdrawal information 56 contained in the request signal is deducted from the amount of money indicated by the prepayment balance information 39 contained in the application information. The balance is updated and stored as the prepayment information 39 in the application information. If the value of the flag F(2) is determined to be "0", the balance is insufficient. In step S25 the contents of the RAM 13 where the data item D(3) is set are read. In step S26 the use authorization bit 32 of the application in formation is set at "0".

Figure 9:
FIG. 9 is a view showing the structure of data contained in a response signal used in the second embodiment.
Figure 10:
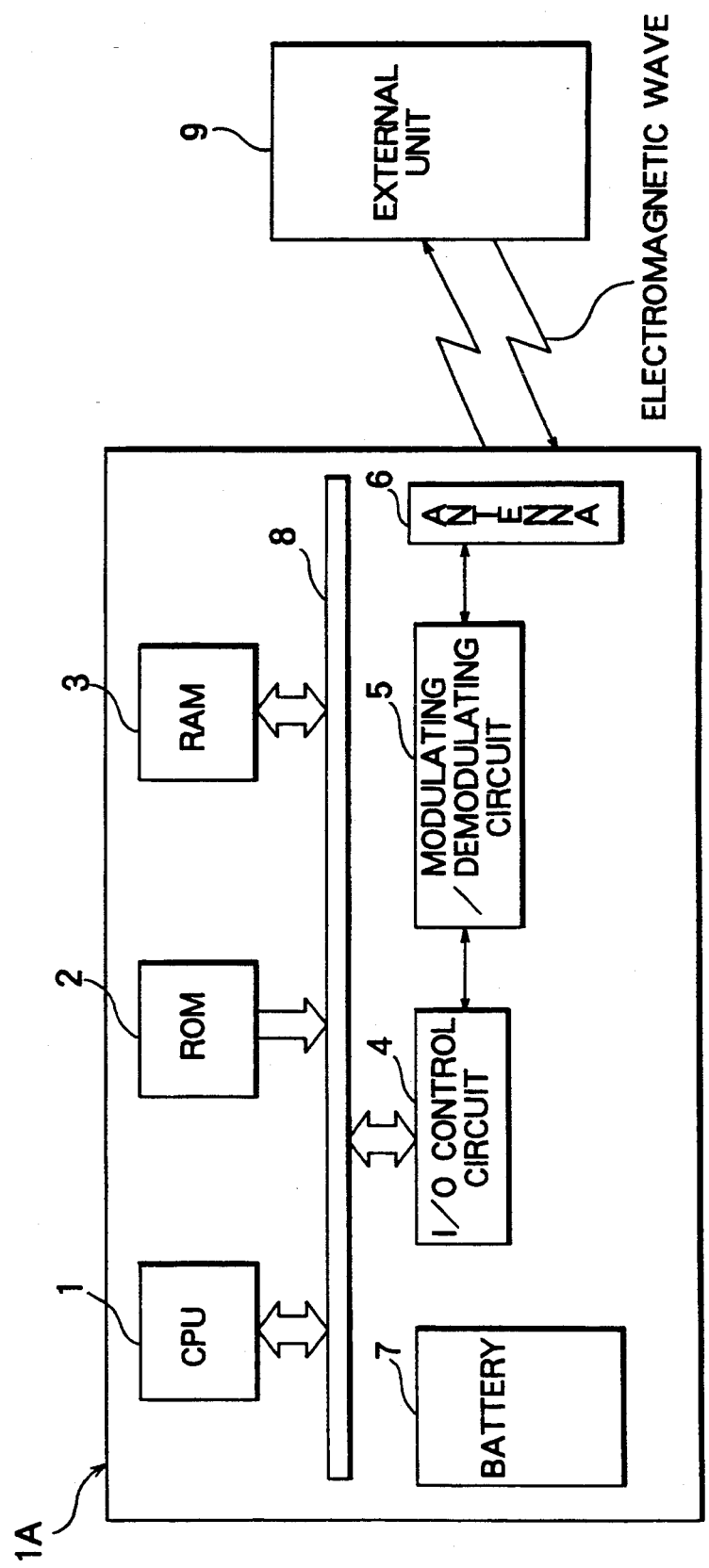
FIG. 10 is a block diagram showing the conventional non-contact IC card.

The contents of the memory read in steps S21, S23 and S25 are transmitted to the external unit in the form of a response signal. FIG. 9 shows the structure of data contained in the response signal. The response signal includes a start flag 71, the value 72 of the flag F(1), the value 73 of the flag F(2), a transmission data identifying code 74, transmission data 75 and an end flag 76. The transmission data identifying code 74 indicates the range within which the data is read from the RAM 13. Any one of the data items D(1) to D(3) of the application information is assigned to the transmission data identifying code 74. For instance, when the deduction process is performed in step S24, the values 72 and 73 of the flags F(1) and F(2) are each "1", whereas the transmission data identifying code 74 contains the data item D(2). Thus, the contents of the memory where the data item D(2) of the application information is set are the transmission data 75.

After the response signal has been transmitted in this manner, the CPU 11 is stopped in step S28.

In step S12 if the value of the use authorization bit 32 is determined to be "0", or in step S13 it is determined that the system ID code 31 contained in the application information does not agree with the system ID code 52 contained in the request signal, then the response signal is not transmitted to the external unit, and the operation immediately proceeds to step; S28, where the CPU 11 is stopped.

As described above, in the second embodiment, radio interference and the like can be prevented since the system ID code 31 contained in the application information is collated with the system ID code 52 contained in the request signal. At the same time, the response signal is transmitted to the external unit depending upon whether the passage time is within the valid period, and the amount of money can be deducted. It is thus possible to shorten the amount of time required to effectively perform the communication process in response to an external unit.

In the second embodiment described above, although the data items D(1) to D(3) for setting the start address and length used for reading the RAM 13 are stored in the zone 131 of the RAM 13, these items may also be stored in the ROM 12.

What is claimed is:

1. A non-contact IC card comprising:
   data transmitting/receiving means for exchanging data with an external unit without direct contact;
   a memory storing system identification information identifying a system including said IC card and the external unit intended exchange data without direct contact and use authorization information indicating whether use of said IC card is authorized;
   data processing means connected to said data transmitting/receiving means and said memory for processing a request signal received by said data transmitting/receiving means and for generating a response signal for transmission to the external unit through said data transmitting/receiving means;
   first determining means connected to said data transmitting/receiving means and said memory for determining, when said data transmitting/receiving means receives a request signal, whether the system identification information stored in said memory agrees with system identification information in the request signal identifying the system;
   second determining means connected to said data transmitting/receiving means and said memory for determining, when said data transmitting/receiving means receives a request signal, whether the use authorization information stored in said memory indicates that use of said IC card is authorized; and
   stopping means connected to said data processing means and said first and second determining means for stopping, when at least one of said first determining means determines that the system identification information in said memory does not agree with the system identification information in a request signal and said second determining means determines that use of said IC card is not authorized, operation of said data processing means until said data transmitting/receiving means receives another request signal.

2. The non-contact IC card as claimed in claim 1 wherein valid period information indicating a valid period during which said IC card can be used is stored in said memory and wherein said data processing means stores, in response to time information contained in the request signal received by said data transmitting/receiving means outside a valid period indicated by the valid period information, in said memory use authorization information indicating no authorization for use of said IC card.

3. A non-contact IC card comprising:
   data transmitting/receiving means for exchanging data with an external unit without direct contact;
   a memory storing control information, system identification information identifying a system including said IC card and the external unit intended to exchange data without direct contact, and use authorization information indicating whether use of said IC card is authorized;
   collating means connected to said data transmit-ting-/receiving means and said memory for collating collation information contained in a request signal with the control information stored in said memory in response to a request signal received by said data transmitting/receiving means;
   data processing means connected to said memory and said collating means for reading from said memory data based on a collation by said collating means for generating a response signal transmitted through said data transmitting/receiving means;
   first determining means connected to said data transmitting/receiving means and said memory for determining, when said data transmitting/receiving means receives a request signal, whether the system identification information stored in said memory agrees with system identification information in the request signal identifying the system;
   second determining means connected to said data transmitting/receiving means and said memory for determining, when said data transmitting/receiving means receives a request signal, whether the use authorization information stored in said memory indicates that use of said IC card is authorized; and
   stopping means connected to said first and second determining means and said data transmitting- /receiving means for stopping, when at least one of said first determining means determines that the system identification information in said memory does not agree with the system identification information in a request signal and said second determining means determines that use of said IC card is not authorized, operation of said data processing means until said data transmitting/receiving means receives another request signal.

4. The non-contact IC card as claimed in claim 3 wherein said IC card is a prepayment type card, wherein prepayment balance information as control information indicating a balance is stored in said memory, and wherein said collating means collates the balance indicated by the prepayment balance information with an amount of money indicated by withdrawal information contained in the request signal received by said data transmitting/receiving means.

5. The non-contact IC card as claimed in claim 4 wherein said data processing means deducts from the balance when said collating means determines that the amount of money can be deducted as a result of the collation, and said data processing means reads contents of a predetermined zone in said memory for transmission as a response signal when said collating means determines that the amount of money cannot be deducted.

6. The non-contact IC card as claimed in claim 5 wherein valid period information indicating a valid period during which said IC card can be used is stored in said memory and wherein said data processing means deducts from the balance only when time indicated by time information contained in the request signal received by said data transmitting/receiving means is within the valid period and when said collating means determines that the amount of money can be deducted from the balance.

* * * * *

UNITED STATES PATENT AND TRADEMARK OFFICE
CERTIFICATE OF CORRECTION

PATENT NO. : 5,382,778
DATED : January 17, 1995
INVENTOR(S) : Takahira et al.

It is certified that error appears in the above-indentified patent and that said Letters Patent is hereby corrected as shown below:

Column 7, Line 56, change "intended exchange" to --intended to exchange--;

Column 8, Line 42, change "transmit-ting-/receiving" to --transmitting/receiving--.

Signed and Sealed this

Eighteenth Day of April, 1995

Attest:

BRUCE LEHMAN

Attesting Officer

Commissioner of Patents and Trademarks